United States Patent
Yoneda et al.

(10) Patent No.: US 10,486,703 B2
(45) Date of Patent: Nov. 26, 2019

(54) CONTROL DEVICE FOR VEHICLE

(71) Applicant: SUBARU CORPORATION, Tokyo (JP)

(72) Inventors: Takeshi Yoneda, Tokyo (JP); Hiroshi Ienaga, Tokyo (JP); Takahiro Kobayashi, Tokyo (JP); Shinichi Sakaguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 23 days.

(21) Appl. No.: 15/879,216

(22) Filed: Jan. 24, 2018

(65) Prior Publication Data
US 2018/0265092 A1    Sep. 20, 2018

(30) Foreign Application Priority Data

Mar. 17, 2017  (JP) .................. 2017-052930

(51) Int. Cl.
| | | |
|---|---|---|
| *B60K 23/08* | (2006.01) | |
| *B60W 30/18* | (2012.01) | |
| *B60W 50/00* | (2006.01) | |
| *B60K 17/34* | (2006.01) | |
| *B60K 17/356* | (2006.01) | |
| *B60K 17/354* | (2006.01) | |

(52) U.S. Cl.
CPC ... *B60W 30/18172* (2013.01); *B60K 23/0808* (2013.01); *B60W 50/0097* (2013.01); *B60K 17/34* (2013.01); *B60K 17/354* (2013.01); *B60K 17/356* (2013.01); *B60K 2023/085* (2013.01); *B60W 2540/04* (2013.01); *B60W 2550/148* (2013.01); *B60W 2720/403* (2013.01); *Y02T 10/6221* (2013.01); *Y02T 10/6265* (2013.01)

(58) Field of Classification Search
CPC ..... B60W 30/18172; B60W 2550/148; B60W 2720/40; B60W 2720/403; B60K 23/0808; B60K 2023/0816–0833; B60K 2023/085; B60K 2023/0858
See application file for complete search history.

(56) References Cited

U.S. PATENT DOCUMENTS

| | | |
|---|---|---|
| 2002/0055416 A1 | 5/2002 | Sakakiyama |
| 2007/0112499 A1 | 5/2007 | Matsuno et al. |
| 2017/0320389 A1* | 11/2017 | Burt ............ B60K 17/346 |

FOREIGN PATENT DOCUMENTS

| | | |
|---|---|---|
| JP | S 61-191431 A | 8/1986 |
| JP | 2002-127772 A | 5/2002 |
| JP | 2007-131062 A | 5/2007 |
| JP | 2007-131191 A | 5/2007 |
| JP | 2007-314099 A | 12/2007 |
| JP | 2011-230543 A | 11/2011 |

OTHER PUBLICATIONS

Japanese Office Action, dated Jun. 26, 2018, in Japanese Application No. 2017-052930 and English Translation thereof.

* cited by examiner

*Primary Examiner* — Erin D Bishop
(74) *Attorney, Agent, or Firm* — McGinn I.P. Law Group, PLLC.

(57) ABSTRACT

A control device for a vehicle includes a controller configured to cause a transition of distribution of driving forces of front wheels and rear wheels, from first distribution to second distribution at a predetermined time change rate, until the vehicle arrives at a point of change. The point of change is a point at which a friction coefficient of a road surface changes frontward of the vehicle.

20 Claims, 7 Drawing Sheets

CONTROL DEVICE FOR VEHICLE

CROSS-REFERENCE TO RELATED APPLICATIONS

The present application claims priority from Japanese Patent Application No. 2017-052930 filed on Mar. 17, 2017, the entire contents of which are hereby incorporated by reference.

BACKGROUND

The technology relates to a control device for a vehicle.

A vehicle has been known that is able to separately generate a driving force of front wheels and a driving force of rear wheels. Regarding such a vehicle, proposals have been made for various techniques aimed at stabilization of vehicle behavior by controlling distribution of the driving forces of the front wheels and the rear wheels. Hereinafter, the distribution of the driving forces of the front wheels and the rear wheels is also called driving-force distribution of front and rear wheels.

For example, Japanese Unexamined Patent Application Publication (JP-A) No. 2002-127772 describes a technique of controlling an engaging force of a transfer clutch as a torque transmission capacity variable clutch, to control a torque distribution ratio on the basis of various state quantities, in a front-engine-front-drive-vehicle-based (FF-based) four-wheel drive vehicle that is able to vary the torque distribution ratio of front wheels to rear wheels in a range from 100:0 to 50:50 both inclusive.

SUMMARY

The control of the driving-force distribution of the front and rear wheels may be accompanied by an abrupt change in vehicle behavior, causing possibility of giving a driver a sense of incongruity.

It is desirable to provide a new and improved control device for a vehicle that makes it possible to restrain an abrupt change in vehicle behavior, while enhancing stability of the vehicle.

An aspect of the technology provides a control device for a vehicle. The control device includes a controller configured to cause a transition of distribution of driving forces of front wheels and rear wheels, from first distribution to second distribution at a predetermined time change rate, until the vehicle arrives at a point of change. The point of change is a point at which a friction coefficient of a road surface changes frontward of the vehicle.

An aspect of the technology provides a control device for a vehicle. The control device includes circuitry configured to cause a transition of distribution of driving forces of front wheels and rear wheels, from first distribution to second distribution at a predetermined time change rate, until the vehicle arrives at a point of change. The point of change is a point at which a friction coefficient of a road surface changes frontward of the vehicle.

DETAILED DESCRIPTION

In the following, some implementations of the technology are described in detail with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. In the description of the implementations, constituent elements having substantially the same functions and configurations are denoted by the same reference characters, with description thereof omitted to avoid redundancy.

1. VEHICLE IN OUTLINE

Figure 1:
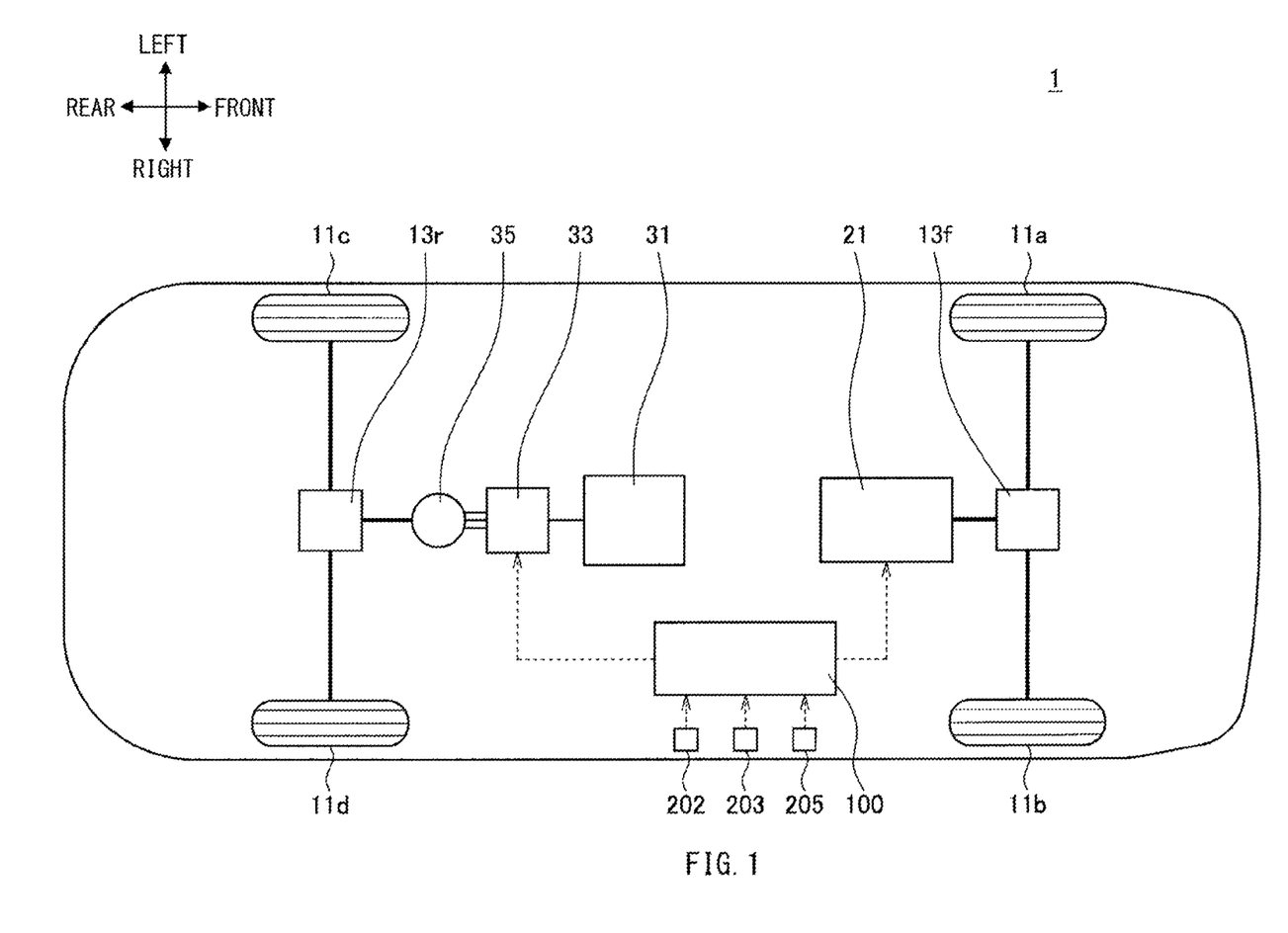
FIG. 1 schematically illustrates in outline one example of a configuration of a drive system of a vehicle according to one implementation of the technology.
Figure 2:
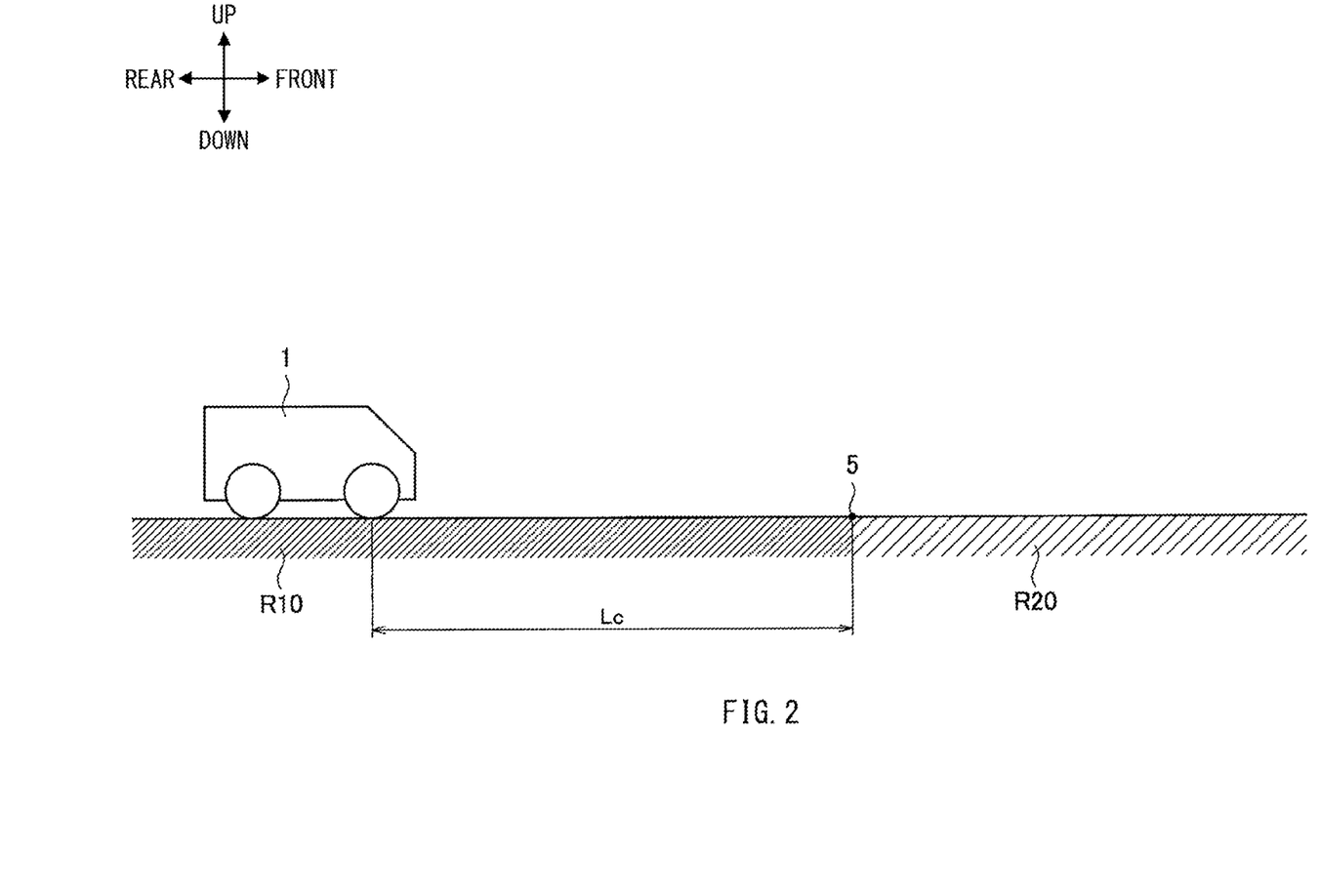
FIG. 2 illustrates relation of the vehicle to a point of change in a friction coefficient of a road surface frontward of the vehicle.

First, with reference to FIGS. 1 and 2, described in outline is a vehicle 1 according to one implementation of the technology. FIG. 1 schematically illustrates in outline one example of a configuration of a drive system of the vehicle 1 according to the implementation.

The vehicle 1 is one example of a vehicle including a control device according to this implementation. In one specific but non-limiting example, the vehicle 1 may include an engine 21 and a drive motor 35, as illustrated in FIG. 1. The engine 21 may serve as a driving source that drives a left front wheel 11$a$ and a right front wheel 11$b$. The drive motor 35 may serve as a driving source that drives a left rear wheel 11$c$ and a right rear wheel 11$d$. The vehicle 1 may further include a control device 100 that controls the engine 21 and the drive motor 35. It is to be noted that the following description is given, with a direction of an advance of the vehicle 1 being referred to as a front direction, with an opposite direction to the direction of the advance being referred to as a rear direction, with left side and right side as turned to the direction of the advance being referred to as a left direction and a right direction, and with vertically upper side and vertically lower side being referred to as an up direction and a down direction.

The engine 21 may be, for example, an internal combustion engine that generates motive power with, for example, gasoline as fuel, and be able to output the motive power that drives the left front wheel 11a and the right front wheel 11b. The motive power outputted from the engine 21 may be transmitted to a front differential device 13f. The front differential device 13f may be coupled to each of the left front wheel 11a and the right front wheel 11b, through a drive shaft. The motive power outputted from the engine 21 may be distributed and transmitted to the left front wheel 11a and the right front wheel 11b by the front differential device 13f. It is to be noted that the engine 21 may be coupled to the front differential device 13f through an undepicted deceleration device.

The drive motor 35 may be able to output motive power that drives the left rear wheel 11c and the right rear wheel 11d, with the utilization of electric power supplied from a battery 31. The motive power outputted from the drive motor 35 may be transmitted to a rear differential device 13r. The rear differential device 13r may be coupled to each of the left rear wheel 11c and the right rear wheel 11d, through a drive shaft. The motive power outputted from the drive motor 35 may be distributed and transmitted to the left rear wheel 11c and the right rear wheel 11d by the rear differential device 13r. It is to be noted that the drive motor 35 may be coupled to the rear differential device 13r through an undepicted deceleration device.

The drive motor 35 may be, for example, a poly-phase alternating current (AC) motor, and be electrically coupled to the battery 31 through an inverter 33. Direct current (DC) power supplied from the battery 31 may be converted to AC power by the inverter 33, and the AC power may be supplied to the drive motor 35. Thus, the motive power may be generated by the drive motor 35. It is to be noted that the drive motor 35 may have a function as a generator that performs power generation with the utilization of kinetic energy of the vehicle 1 in deceleration of the vehicle 1. In a case where the drive motor 35 functions as the generator, the drive motor 35 may generate AC power with the utilization of rotational energy of the left rear wheel 11c and the right rear wheel 11d. The AC power may be converted by the inverter 33 to DC power, and the DC power may be stored in the battery 31. This gives a resistance to rotation of the left rear wheel 11c and the right rear wheel 11d, causing generation of brake power.

The vehicle 1 may include various sensors. For example, as illustrated in FIG. 1, the vehicle 1 may include a speed sensor 202, an acceleration sensor 203, and a road-surface μ sensor 205.

The speed sensor 202 may detect a speed of the vehicle 1, and output a detection result.

The acceleration sensor 203 may detect acceleration of the vehicle 1, and output a detection result.

The road-surface μ sensor 205 may detect distribution of a friction coefficient of a road surface frontward of the vehicle 1, and output a detection result. In one specific but non-limiting example, the road-surface μ sensor 205 may detect spatial distribution of the friction coefficient of the road surface frontward of the vehicle 1 along the direction of the advance. The road-surface μ sensor 205 may be, for example, a device that sends out a millimeter wave on the frontward road surface, captures its reflected wave to measure an amount of moisture of the road surface, and detects the distribution of the friction coefficient of the road surface frontward of the vehicle 1 on the basis of a measurement result of the amount of the moisture. Alternatively, the road-surface μ sensor 205 may be a device that captures an image of the frontward road surface, and performs image processing on the image obtained, to detect the distribution of the friction coefficient of the road surface frontward of the vehicle 1.

The control device 100 may include, for example, a central processing unit (CPU), a read only memory (ROM), and a random access memory (RAM). The CPU may be a computation processing device. The ROM may be a storage element that stores, for example, programs to be used by the CPU and computation parameters. The RAM may be a storage element that temporarily stores, for example, parameters that change as appropriate in execution by the CPU.

The control device 100 may control operation of each of the devices that constitute the vehicle 1. For example, the control device 100 may output an operational instruction to each of the devices as a target of control, with the use of an electrical signal, to control the operation of each of the devices. In one specific but non-limiting example, the control device 100 may control operation of each device of the engine 21, e.g., a throttle valve, an ignition plug, and a fuel injection valve, to control drive of the engine 21. Moreover, the control device 100 may control operation of the inverter 33, to control drive and the power generation of the drive motor 35. Thus, the control device 100 may be able to control each of an output of the engine 21 and an output of the drive motor 35. Accordingly, the control device 100 may be able to control each of a driving force of the front wheels and a driving force of the rear wheels. Therefore, the control device 100 may be able to control distribution of the driving forces of the front wheels and the rear wheels, i.e., driving-force distribution of the front and rear wheels.

Moreover, the control device 100 may receive information outputted from each of the devices. Communication of the control device 100 with each of the devices may be performed with the use of, for example, controller area network (CAN) communication. For example, the control device 100 may receive various kinds of the detection results outputted from the speed sensor 202, the acceleration sensor 203, and the road-surface μ sensor 205. Moreover, the control device 100 may receive information indicating a requested driving force. The requested driving force may be a requested value of a driving force that allows the vehicle 1 to travel, and be outputted from another control device that calculates the requested driving force. It is to be noted that the requested driving force may be calculated by the control device 100. The control device 100 may control the driving-force distribution of the front and rear wheels, to bring a total of the driving force of the front wheels and the driving force of the rear wheels to the requested driving force. It is to be noted that the functions of the control device 100 according to this implementation may be distributed to a plurality of control devices. In this case, the plurality of the control devices may be coupled to one another through a communication bus such as the CAN.

As described above, the control device 100 may control the driving-force distribution of the front and rear wheels. In one specific but non-limiting example, the controller 160 may control the driving-force distribution of the front and rear wheels to differ between on travel on a high-μ, road of a relatively high friction coefficient and on travel on a low-μ road of a relatively low friction coefficient. Such a control may be performed with the utilization of, for example, the detection result regarding the distribution of the friction coefficient of the road surface frontward of the vehicle 1 outputted from the road-surface μ sensor 205. In one specific but non-limiting example, in a case where the friction coefficient of the road surface is equal to or larger than a predetermined threshold, the control device 100 may determine that the relevant road surface is the high-μ, road. In a case where the friction coefficient of the road surface is smaller than the predetermined threshold, the control device 100 may determine that the relevant road surface is the low-μ road. The predetermined threshold may be set, as appropriate, at a value that makes it possible to determine whether or not the road surface as a target of determination is the low-μ road such as a frozen road surface.

FIG. 2 illustrates relation of the vehicle 1 to a point of change 5 in the friction coefficient of the road surface frontward of the vehicle 1. Specifically, FIG. 2 illustrates a state in which the vehicle 1 is traveling on a high-μ, road R10 to which a low-μ road R20 is coupled frontward. The point of change 5 may be a point at which the friction coefficient of the road surface changes frontward of the vehicle 1. In the example illustrated in FIG. 2, a coupling part of a front end of the high-μ, road R10 to a rear end of the low-μ road R20 corresponds to the point of change 5. For example, on travel on the high-μ, road R10, the control device 100 may control the driving-force distribution of the front and rear wheels, to bring a drive state of the vehicle 1 to a two-wheel drive state. This makes it possible to improve fuel consumption. Meanwhile, for example, on travel on the low-μ road R20, the control device 100 may control the driving-force distribution of the front and rear wheels, to bring the drive state of the vehicle 1 to a four-wheel drive state in which the driving forces are equally distributed to the front and rear wheels. This makes it possible to enhance stability of the vehicle 1.

Meanwhile, in this implementation, as mentioned above, the control device 100 may control the driving-force distribution of the front and rear wheels, to differ between on travel rearward of the point of change 5 in the friction coefficient of the road surface and on travel frontward of the point of change 5. Accordingly, the control device 100 may switch the driving-force distribution of the front and rear wheels from first distribution to second distribution, as the vehicle 1 passes through the point of change 5. In such a switching control of the driving-force distribution of the front and rear wheels to be performed by the control device 100 according to this implementation, it is possible to restrain an abrupt change in vehicle behavior, while enhancing vehicle stability. Details of the control device 100 as described above are described later.

It is to be noted that the control device 100 may acquire the detection result regarding the distribution of the friction coefficient of the road surface frontward of the vehicle 1, from an external device. For example, the control device 100 may acquire the detection result regarding the distribution of the friction coefficient by performing road-vehicle communication with a roadside machine. In this case, the road-surface μ sensor 205 may be omitted from the configuration of the vehicle 1.

2. CONTROL DEVICE

Description now moves on to the details of the control device 100 according to this implementation, with reference to FIGS. 3 to 10.

[2-1. Functional Configuration]

Figure 3:
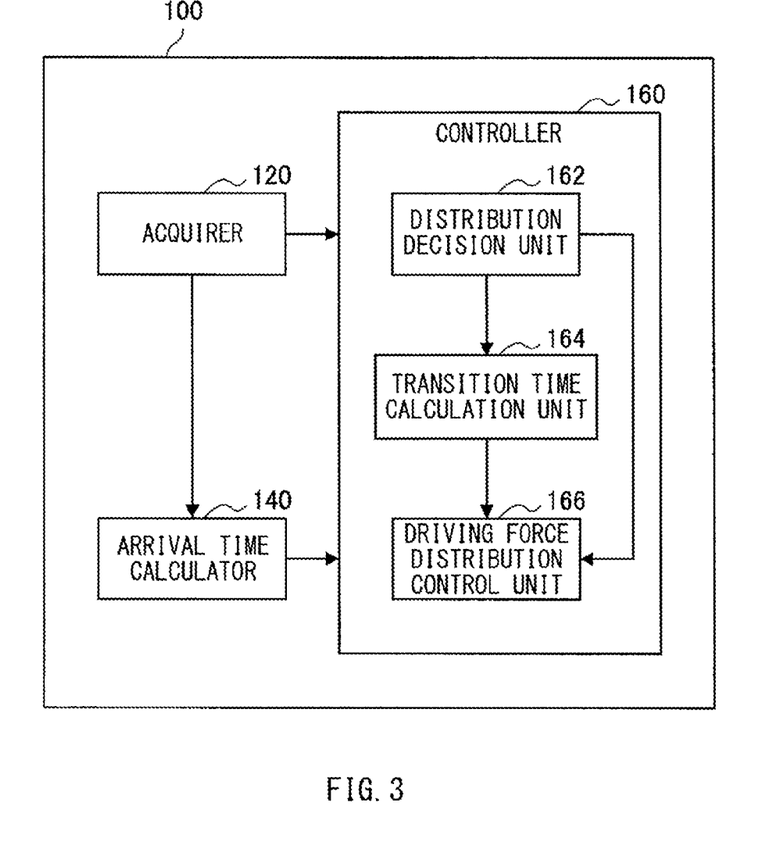
FIG. 3 is a block diagram of one example of a functional configuration of a control device according to the implementation.

First, with reference to FIG. 3, described is a functional configuration of the control device 100 according to this implementation. FIG. 3 is a block diagram of one example of the functional configuration of the control device 100 according to this implementation.

The control device 100 may include, for example, as illustrated in FIG. 3, an acquirer 120, an arrival time calculator 140, and the controller 160.

[Acquirer]

The acquirer 120 may acquire various kinds of information outputted from external devices. Moreover, the acquirer 120 may output the various kinds of the information acquired, to the arrival time calculator 140 and the controller 160. In one specific but non-limiting example, the acquirer 120 may acquire the detection results outputted from the speed sensor 202, the acceleration sensor 203, and the road-surface μ sensor 205. Moreover, the acquirer 120 may acquire the information indicating the requested driving force outputted from the control device that calculates the requested driving force.

The acquirer 120 may extract the various kinds of the information from the detection results outputted from the sensors, to acquire the various kinds of the information. In one specific but non-limiting example, the acquirer 120 may extract change information, i.e., information regarding the change in the friction coefficient of the road surface frontward of the vehicle 1, from the detection result outputted from the road-surface μ sensor 205, to acquire the change information. The acquirer 120 may acquire, as the change information, for example, information indicating a distance Lc from the vehicle 1 to the point of change 5 in the friction coefficient, as illustrated in FIG. 2. Moreover, the acquirer 120 may acquire, as the change information, information indicating the friction coefficients of the road surface frontward and rearward of the point of change 5. In one specific but non-limiting example, the acquirer 120 may acquire, as the change information, information indicating the friction coefficient of the high-μ, road R10 rearward of the point of change 5 illustrated in FIG. 2, and information indicating the friction coefficient of the low-μ road R20 frontward of the point of change 5. In the following, returning to FIG. 3, continued is the description of the functional configuration of the control device 100.

[Arrival Time Calculator]

The arrival time calculator 140 may calculate arrival time it takes for the vehicle 1 to arrive at the point of change 5, i.e., the point at which the friction coefficient of the road surface changes frontward of the vehicle 1. The arrival time calculator 140 may output, to the controller 160, information indicating the arrival time thus calculated. In one specific but non-limiting example, the arrival time calculator 140 may execute calculation processing of the arrival time, in a case where the point of change 5 is detected frontward of the vehicle 1.

The arrival time calculator 140 may calculate the arrival time Ta, on the basis of, for example, the speed V of the vehicle 1 at a current point of time, the acceleration A of the vehicle 1, and the distance Lc from the vehicle 1 to the point of change 5. This makes it possible to appropriately calculate, at each point of time, the arrival time Ta it takes for the vehicle 1 to arrive at the point of change 5. For example, a distance L may be given by the following expression (1), on an assumption that the acceleration A is constant. The distance L is a distance by which the vehicle 1 advances until time t elapses from the current point of time.

$$L = \frac{1}{2}At^2 + Vt \qquad (1)$$

Therefore, the arrival time calculator 140 may be able to calculate the arrival time Ta by solving a quadratic equation obtained by substituting the distance Lc from the vehicle 1 to the point of change 5 for the distance L in the expression (1), and by substituting the arrival time Ta for the time tin the expression (1).

[Controller]

The controller 160 may control the driving-force distribution of the front and rear wheels. In one specific but non-limiting example, the controller 160 may control the driving-force distribution of the front and rear wheels to differ between on travel on the high-μ road R10 and on travel on the low-μ road R20. Here, the controller 160 may be able to control the driving-force distribution of the front and rear wheels by controlling, for example, a distribution rate of the driving force of the front wheels, i.e., a driving-force distribution rate of the front wheels. In the following, the driving-force distribution rate of the front wheels on travel on the high-μ road R10 is referred to as a high-μ road distribution rate, while the driving-force distribution rate of the front wheels on travel on the low-μ road R20 is referred to as a low-μ road distribution rate.

The high-μ road distribution rate may be, for example, zero (0). In this case, the controller 160 may basically bring the driving-force distribution rate of the front wheels to zero (0) on travel on the high-μ road R10, and thereby bring the drive state of the vehicle 1 to the two-wheel drive state. This makes it possible to improve the fuel consumption. Meanwhile, the low-μ road distribution rate may be, for example, 0.5. In this case, the controller 160 may basically bring the driving-force distribution rate of the front wheels to 0.5 on travel on the low-μ road R20, and thereby bring the drive state of the vehicle 1 to the four-wheel drive state in which the driving forces are equally distributed to the front and rear wheels. This makes it possible to enhance the stability of the vehicle 1. It is to be noted that the forgoing control to be performed by the controller 160 may be performed, as described above, with the utilization of, for example, the detection result outputted from the road-surface μ sensor 205 regarding the distribution of the friction coefficient of the road surface frontward of the vehicle 1.

As described, the controller 160 may control the driving-force distribution of the front and rear wheels to differ between on travel rearward of the point of change 5 in the friction coefficient of the road surface and on travel frontward of the point of change 5. The controller 160 may, therefore, switch the driving-force distribution of the front and rear wheels from the first distribution to the second distribution, as the vehicle 1 passes through the point of change 5.

In one specific but non-limiting example, in a case where the friction coefficient of the road surface decreases at the point of change 5, the controller 160 may switch the driving-force distribution of the front and rear wheels from high-μ road distribution as the first distribution to low-μ road distribution as the second distribution. Here, the case where the friction coefficient of the road surface decreases at the point of change 5 is, in other words, a case where as illustrated in FIG. 2, the low-μ road R20 is coupled frontward of the high-μ road R10 on which the vehicle 1 is traveling. Moreover, the high-μ road distribution is driving-force distribution on travel on the high-μ road R10, i.e., the driving-force distribution of the front and rear wheels in which the driving-force distribution rate of the front wheels is brought to the high-μ road distribution rate. The low-μ road distribution is driving-force distribution on travel on the low-μ road R20, i.e., the driving-force distribution of the front and rear wheels in which the driving-force distribution rate of the front wheels is brought to the low-μ road distribution rate. Meanwhile, in a case where the friction coefficient of the road surface increases at the point of change 5, the controller 160 may switch the driving-force distribution of the front and rear wheels from the low-μ road distribution as the first distribution to the high-μ road distribution as the second distribution. Here, the case where the friction coefficient of the road surface increases at the point of change 5 is, in other words, a case where the high-μ road R10 is coupled frontward of the low-μ road R20 on which the vehicle 1 is traveling.

The controller 160 according to this implementation causes a transition of the driving-force distribution of the front and rear wheels, from the first distribution to the second distribution at a predetermined time change rate, until the vehicle 1 arrives at the point of change 5. The predetermined time change rate may be a constant time change rate independent of passage of time, or alternatively, the predetermined time change rate may be a variable time change rate with the passage of time. In one preferred but non-limiting example, the predetermined time change rate may be a time change rate that is able to reduce a sense of incongruity given to the driver. Moreover, the predetermined time change rate may be an identical time change rate independent of the first distribution and the second distribution. In one specific but non-limiting example, the controller 160 may execute the transition of the driving-force distribution of the front and rear wheels from the high-μ road distribution as the first distribution to the low-μ road distribution as the second distribution at the predetermined time change rate, in the case where the friction coefficient of the road surface decreases at the point of change 5. For example, the controller 160 may cause a transition of the driving-force distribution rate of the front wheels from the high-μ road distribution rate to the low-μ road distribution rate within the arrival time Ta, in the case where the friction coefficient of the road surface decreases at the point of change 5.

As described, the high-μ road distribution rate, i.e., the driving-force distribution rate of the front wheels in the high-μ road distribution, may be, for example, zero (0). Accordingly, a driving-force distribution rate of the rear wheels in the high-μ road distribution may be 1. Meanwhile, as described, the low-μ road distribution rate, i.e., the driving-force distribution rate of the front wheels in the low-μ road distribution, may be, for example, 0.5. Accordingly, the driving-force distribution rate of the rear wheels in the low-μ road distribution may be 0.5, and substantially coincide with the driving-force distribution rate of the front wheels. Thus, in the case where the friction coefficient of the road surface decreases at the point of change 5, a difference between the driving-force distribution rate of the front wheels and the driving-force distribution rate of the rear wheels in the second distribution may be smaller than that in the first distribution. In general, as the difference between the driving-force distribution rate of the front wheels and the driving-force distribution rate of the rear wheels is smaller, an effect of enhancing the stability of the vehicle 1 becomes greater. Accordingly, making the difference between the driving-force distribution rate of the front wheels and the driving-force distribution rate of the rear wheels in the low-μ road distribution smaller than that in the high-µ road distribution makes it possible to enhance the stability of the vehicle 1.

In the following, more specific description is given of a functional configuration of the controller 160. As illustrated in FIG. 3, the controller 160 may include a distribution decision unit 162, a transition time calculation unit 164, and a driving force distribution control unit 166.

The distribution decision unit 162 may decide the first distribution and the second distribution. In one specific but non-limiting example, the distribution decision unit 162 may decide the high-µ road distribution as the first distribution and the low-µ road distribution as the second distribution, in the case where the friction coefficient of the road surface decreases at the point of change 5. In one more specific but non-limiting example, the distribution decision unit 162 may be able to decide the high-µ road distribution and the low-µ road distribution in the case where the friction coefficient of the road surface decreases at the point of change 5, by deciding the high-µ road distribution rate and the low-µ road distribution rate. Moreover, the distribution decision unit 162 may output information indicating the high-µ road distribution rate and the low-µ road distribution rate thus decided, to the transition time calculation unit 164 and the driving force distribution control unit 166.

The high-µ road distribution rate may be set in advance on the basis of, for example, design specification of the vehicle 1. In this case, for example, a setting value of the high-µ road distribution rate may be stored in advance in a storage element of the control device 100. The distribution decision unit 162 may decide the high-µ road distribution rate to be the setting value stored in the storage element.

Moreover, the distribution decision unit 162 may decide the high-µ road distribution as the first distribution in response to an operation of selection made by the driver of the vehicle 1. In one specific but non-limiting example, the distribution decision unit 162 may decide the high-µ road distribution rate in response to the operation of selection made by the driver. This makes it possible to decide the first distribution to be driving-force distribution desired by the driver.

In one specific but non-limiting example, the vehicle 1 may include an input device that accepts the operation of selection made by the driver. The input device may be, for example but not limited to, a switch. The driver may be able to select a traveling mode with the utilization of the input device. For example, in a case where an energy saving mode has been selected by the driver, the distribution decision unit 162 may decide the high-µ road distribution rate corresponding to the energy saving mode to be, for example, zero (0). The energy saving mode may be a traveling mode that places emphasis on the improvement in the fuel consumption. In a case where a stability emphasizing mode has been selected by the driver, the distribution decision unit 162 may decide the high-µ road distribution rate corresponding to the stability emphasizing mode to be, for example, 0.2. The stability emphasizing mode may be a traveling mode that places more emphasis on the stability of the vehicle 1 than the energy saving mode.

The low-µ road distribution rate may be set in advance on the basis of, for example, the design specification of the vehicle 1. In this case, for example, a setting value of the low-µ road distribution rate may be stored in advance in the storage element of the control device 100. The distribution decision unit 162 may decide the low-µ road distribution rate to be the setting value stored in the storage element.

Moreover, the distribution decision unit 162 may decide the low-µ road distribution as the second distribution, on the basis of road-surface information, i.e., information regarding the road surface frontward of the point of change 5. In one specific but non-limiting example, the distribution decision unit 162 may decide the low-µ road distribution rate on the basis of the road-surface information. This makes it possible to attain the improvement in the fuel consumption appropriately, while enhancing the stability of the vehicle 1, as described later.

The road-surface information may include, for example, information indicating the friction coefficient of the road surface frontward of the point of change 5. The distribution decision unit 162 may, therefore, decide the low-µ road distribution rate on the basis of the information indicating the friction coefficient of the low-µ road R20, i.e., the road surface frontward of the point of change 5. In one specific but non-limiting example, in a case where the friction coefficient of the low-µ road R20 is larger than a friction coefficient threshold, the distribution decision unit 162 may decide the low-µ road distribution rate to be a value smaller than a value in a case where the friction coefficient of the low-µ road R20 is equal to or smaller than the friction coefficient threshold. For example, in the case where the friction coefficient of the low-µ road R20 is larger than the friction coefficient threshold, the distribution decision unit 162 may decide the low-µ road distribution rate to be a first distribution rate that is lower than a second distribution rate. The first distribution rate may be, for example, 0.4. The second distribution rate may be, for example, 0.5. In the case where the friction coefficient of the low-µ road R20 is equal to or smaller than the friction coefficient threshold, the distribution decision unit 162 may decide the low-µ road distribution rate to be the second distribution rate. It is to be noted that the first distribution rate, the second distribution rate, and the friction coefficient threshold may be set as appropriate in accordance with, for example, the design specification of the vehicle 1, to attain the improvement in the fuel consumption, while enhancing stability of the vehicle 1.

As described above, in general, as the difference between the driving-force distribution rate of the front wheels and the driving-force distribution rate of the rear wheels is smaller, the effect of enhancing the stability of the vehicle 1 becomes greater. Meanwhile, as the difference between the driving-force distribution rate of the front wheels and the driving-force distribution rate of the rear wheels is larger, an effect of improving the fuel consumption becomes greater. For example, as the difference between the driving-force distribution rate of the front wheels and the driving-force distribution rate of the rear wheels is larger, it is easier to enhance efficiency of generating of the motive power by the driving source that drives the rear wheels, e.g., the drive motor 35. This leads to the greater effect of improving the fuel consumption. Therefore, deciding the low-µ road distribution rate to be a smaller value as the friction coefficient of the low-µ road R20 is larger makes it possible to attain the improvement in the fuel consumption appropriately in accordance with the friction coefficient of the low-µ road R20. It is to be noted that as mentioned above, the information indicating the friction coefficient of the road surface frontward of the point of change 5 may be acquired as the change information by the acquirer 120.

Moreover, the road-surface information may include information indicating a shape of the road surface frontward of the point of change 5. The distribution decision unit 162 may, therefore, decide the low-µ road distribution rate on the basis of information indicating a shape of the low-μ road R20, i.e., the road surface frontward of the point of change 5. In one specific but non-limiting example, in a case where a curvature of the low-μ road R20 is smaller than a curvature threshold, the distribution decision unit 162 may decide the low-μ road distribution rate to be a value smaller than a value in a case where the curvature of the low-μ road R20 is equal to or larger than the curvature threshold. For example, in the case where the curvature of the low-μ road R20 is smaller than the curvature threshold, the distribution decision unit 162 may decide the low-μ road distribution rate to be the first distribution rate lower than the second distribution rate. The first distribution rate may be, for example, 0.4, while the second distribution rate may be, for example, 0.5. In the case where the curvature of the low-μ road R20 is equal to or larger than the curvature threshold, the distribution decision unit 162 may decide the low-μ distribution rate to be the second distribution rate. It is to be noted that the first distribution rate, the second distribution rate, and the curvature threshold may be set as appropriate in accordance with, for example, the design specification of the vehicle 1, to attain the improvement in the fuel consumption, while enhancing the stability of the vehicle 1.

As described, deciding the low-μ road distribution rate to be the smaller value as the curvature of the low-μ road R20 is smaller makes it possible to attain the improvement in the fuel consumption appropriately in accordance with the shape of the low-μ road R20.

The control device 100 may be able to acquire the information indicating the shape of the road surface frontward of the point of change 5, by receiving the detection result outputted from a sensor that is able to detect the shape of the road surface frontward of the point of change 5. In this case, the sensor may be provided inside the vehicle 1. Alternatively, the control device 100 may acquire the information indicating the shape of the road surface frontward of the point of change 5, from an external device. For example, the control device 100 may acquire the information indicating the shape of the road surface, by performing the inter-vehicle communication with the roadside machine.

The transition time calculation unit 164 may calculate transition time Tm, i.e., time it takes for the driving-force distribution of the front and rear wheels to make the transition from the first distribution to the second distribution at the predetermined time change rate. In one specific but non-limiting example, in the case where the friction coefficient of the road surface decreases at the point of change 5, the transition time calculation unit 164 may calculate the transition time Tm, i.e., time it takes for the driving-force distribution of the front and rear wheels to make a transition from the high-μ road distribution as the first distribution to the low-μ road distribution as the second distribution at the predetermined time change rate. In one more specific but non-limiting example, in the case where the friction coefficient of the road surface decreases at the point of change 5, the transition time calculation unit 164 may calculate, as the transition time Tm, time it takes for the driving-force distribution rate of the front wheels to make a transition from the high-μ road distribution rate to the low-μ road distribution rate. Moreover, the transition time calculation unit 164 may output information indicating the transition time Tm thus calculated, to the driving force distribution control unit 166.

The transition time calculation unit 164 may calculate the transition time Tm on the basis of the high-μ road distribution rate, the low-μ road distribution rate, and a time change rate of the driving-force distribution rate of the front wheels.

The time change rate of the driving-force distribution rate of the front wheels may be a constant time change rate independent of the passage of time, or alternatively, the time change rate of the driving-force distribution rate of the front wheels may be a variable time change rate with the passage of time. Moreover, the time change rate of the driving-force distribution rate of the front wheels may be an identical time change rate independent of the high-μ road distribution rate and the low-μ road distribution rate. It is to be noted that the time change rate of the driving-force distribution rate of the front wheels may be set in advance on the basis of, for example, the design specification of the vehicle 1. In this case, for example, a setting value of the time change rate of the driving-force distribution rate of the front wheels may be stored in advance in the storage element of the control device 100. The transition time calculation unit 164 may acquire the setting value of the time change rate of the driving-force distribution rate of the front wheels from the storage element.

The driving force distribution control unit 166 may control the driving-force distribution of the front and rear wheels, on the basis of the transition time Tm calculated by the transition time calculation unit 164, and on the basis of the arrival time Ta calculated by the arrival time calculator 140. In one specific but non-limiting example, the driving force distribution control unit 166 may start the transition of the driving-force distribution from the first distribution to the second distribution at the predetermined time change rate, on the basis of a comparison result of the transition time Tm to the arrival time Ta. In one more specific but non-limiting example, in a case where the arrival time Ta is longer than the transition time Tm, the driving force distribution control unit 166 may keep from starting the transition of the driving-force distribution from the first distribution to the second distribution, and maintain the driving-force distribution at the first distribution. Upon the arrival time Ta being equal to or shorter than the transition time Tm, the driving force distribution control unit 166 may start the transition of the driving-force distribution from the first distribution to the second distribution at the predetermined time change rate.

As described, the controller 160 may cause the transition of the driving-force distribution from the first distribution to the second distribution at the predetermined time change rate within the arrival time Ta. This makes it possible to prevent the driving-force distribution of the front and rear wheels from being stepwise switched, as the vehicle 1 passes through the point of change 5. Moreover, it is possible to complete switching of the driving-force distribution of the front and rear wheels, at and before the point of time when the vehicle 1 arrives at the point of change 5. It is therefore possible to reduce the sense of incongruity given to the driver caused by the transition of the driving-force distribution of the front and rear wheels. Furthermore, the driving force distribution control unit 166 may start the transition of the driving-force distribution from the first distribution to the second distribution at the predetermined time change rate, on the basis of the comparison result of the transition time Tm to the arrival time Ta. Hence, it is possible to complete the switching of the driving-force distribution of the front and rear wheels within the arrival time Ta.

For example, in the case where the friction coefficient of the road surface decreases at the point of change 5, when the arrival time Ta is longer than the transition time Tm, the driving force distribution control unit 166 may maintain the driving-force distribution rate of the front wheels at the high-μ road distribution rate. Upon the arrival time Ta being equal to or shorter than the transition time Tm, the driving force distribution control unit 166 may start the transition of the driving-force distribution rate of the front wheels from the high-μ road distribution rate to the low-μ road distribution rate. This makes it possible to cause the transition of the driving-force distribution rate of the front wheels from the high-μ road distribution rate to the low-μ road distribution rate within the arrival time Ta. It is to be noted that the driving force distribution control unit 166 may acquire the setting value of the time change rate of the driving-force distribution rate of the front wheels from the storage element of the control device 100.

As described, in the control device 100 according to this implementation, the controller 160 causes the transition of the driving-force distribution of the front and rear wheels from the first distribution to the second distribution at the predetermined time change rate, until the vehicle 1 arrives at the point of change 5, i.e., the point at which the friction coefficient of the road surface changes frontward of the vehicle 1. Accordingly, it is possible to prevent the driving-force distribution of the front and rear wheels from being stepwise switched, as the vehicle 1 passes through the point of change 5. Moreover, it is possible to complete the switching of the driving-force distribution of the front and rear wheels, at and before the point of time when the vehicle 1 arrives at the point of change 5. Hence, it is possible to restrain an abrupt change in behavior of the vehicle 1, while enhancing the stability of the vehicle 1.

Moreover, in one specific but non-limiting example, in the case where the friction coefficient of the road surface decreases at the point of change 5, the controller 160 may execute the transition of the driving-force distribution of the front and rear wheels from the first distribution to the second distribution at the predetermined time change rate. The difference in the second distribution between the driving-force distribution rate of the front wheels and the driving-force distribution rate of the rear wheels may be smaller than that in the first distribution. This makes it possible to restrain the abrupt change in the behavior of the vehicle 1, while enhancing the stability of the vehicle 1, as the vehicle passes through the high-μ, road and enters the low-μ road. It is to be noted that execution of the acquisition processing of the various kinds of the information by the acquirer 120 and execution of the calculation processing of the arrival time Ta by the arrival time calculator 140 may be triggered by a determination that the friction coefficient of the road surface decreases at the point of change 5.

It is to be noted that the control device 100 may cause a transition of an attenuation characteristic of a suspension, in synchronization with the transition of the driving-force distribution of the front and rear wheels. The control device 100 may be able to control the attenuation characteristic, by, for example, outputting an operational instruction to a device that is able to adjust the attenuation characteristic of the suspension. In one specific but non-limiting example, the control device 100 may cause the transition of the attenuation characteristic of the suspension from a first characteristic to a second characteristic, in synchronization with the transition of the driving-force distribution, until the vehicle 1 arrives at the point of change 5. In one more specific but non-limiting example, in the case where the friction coefficient of the road surface decreases at the point of change 5, the control device 100 may cause the transition of the attenuation characteristic of the suspension from a characteristic corresponding to the high-μ road to a characteristic corresponding to the low-μ road. This makes it possible to prevent the attenuation characteristic of the suspension from being stepwise switched, as the vehicle 1 passes through the point of change 5. Hence, it is possible to restrain an abrupt change in the attenuation characteristic of the suspension, leading to more effective reduction in the sense of incongruity given to the driver.

[2-2. Operation]

Next, with reference to FIGS. 4 to 10, described is a flow of processing to be performed by the control device 100 according to this implementation.

Figure 4:
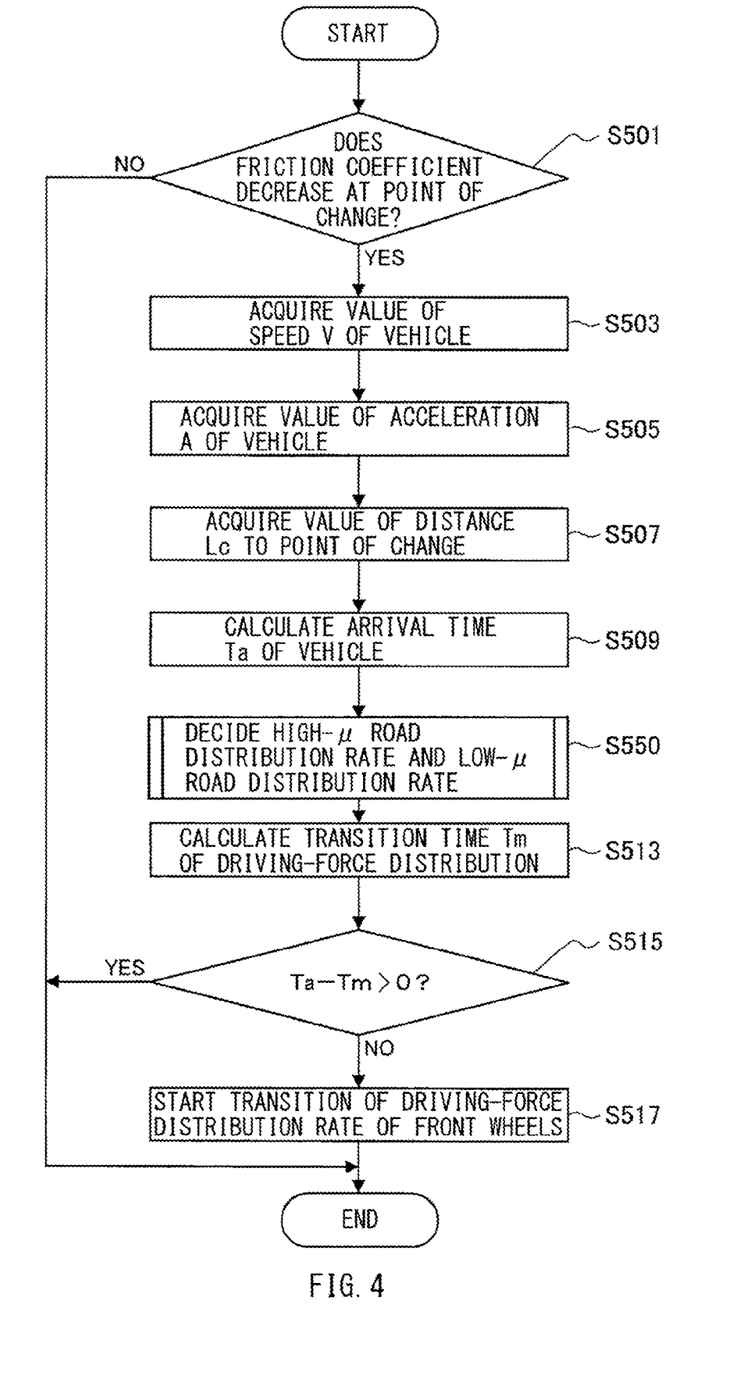
FIG. 4 is a flowchart that illustrates one example of a flow of processing to be performed by the control device according to the implementation.

First, with reference to a flowchart illustrated in FIG. 4, described is a control flow by the control device 100 according to this implementation. FIG. 4 is a flowchart of one example of the flow of the processing to be performed by the control device 100 according to this implementation. The processing illustrated in FIG. 4 may be executed at any time in a case where the point of change 5 is detected. It is to be noted that the control device 100 may be able to detect the point of change 5 with the utilization of, for example, the detection result acquired regarding the distribution of the friction coefficient of the road surface.

As illustrated in FIG. 4, the control device 100 may, first, determine whether or not the friction coefficient decreases at the point of change 5 (step S501). In a case where a determination has not been made that the friction coefficient decreases at the point of change 5 (step S501/NO), the processing illustrated in FIG. 4 may be terminated. In a case where a determination has been made that the friction coefficient decreases at the point of change 5 (step S501/YES), the acquirer 120 may acquire a value of the speed V of the vehicle (step S503), and output the value to the arrival time calculator 140. Thereafter, the acquirer 120 may acquire a value of the acceleration A of the vehicle (step S505), and output the value to the arrival time calculator 140. Thereafter, the acquirer 120 may acquire a value of the distance Lc from the vehicle 1 to the point of change 5 (step S507), and output the value to the arrival time calculator 140.

Thereafter, the arrival time calculator 140 may calculate the arrival time Ta on the basis of the speed V of the vehicle 1 at the current point of time, the acceleration A of the vehicle 1, and the distance Lc from the vehicle 1 to the point of change 5 (step S509). The arrival time calculator 140 may output the information indicating the arrival time Ta thus calculated, to the controller 160. Thereafter, the distribution decision unit 162 may decide the high-μ road distribution rate and the low-μ road distribution rate (step S550). The distribution decision unit 162 may output information indicating the high-μ road distribution rate and the low-μ road distribution rate thus decided, to the transition time calculation unit 164 and the driving force distribution control unit 166. Thereafter, the transition time calculation unit 164 may calculate the transition time Tm on the basis of the high-μ road distribution rate, the low-μ road distribution rate, and the time change rate of the driving-force distribution rate of the front wheels (step S513). The transition time calculation unit 164 may output information indicating the transition time Tm thus calculated, to the driving force distribution control unit 166.

Thereafter, the driving force distribution control unit 166 may determine whether or not the arrival time Ta is longer than the transition time Tm (step S515). In a case where the arrival time Ta has been determined as being longer than the transition time Tm (step S515/YES), the processing illustrated in FIG. 4 may be terminated. In a case where the arrival time Ta has not been determined as being longer than the transition time Tm (step S515/NO), the driving force distribution control unit 166 may start the transition of the driving-force distribution rate of the front wheels from the high-μ road distribution rate to the low-μ road distribution rate (step S517). Thereafter, the processing illustrated in FIG. 4 may be terminated.

Figure 5:
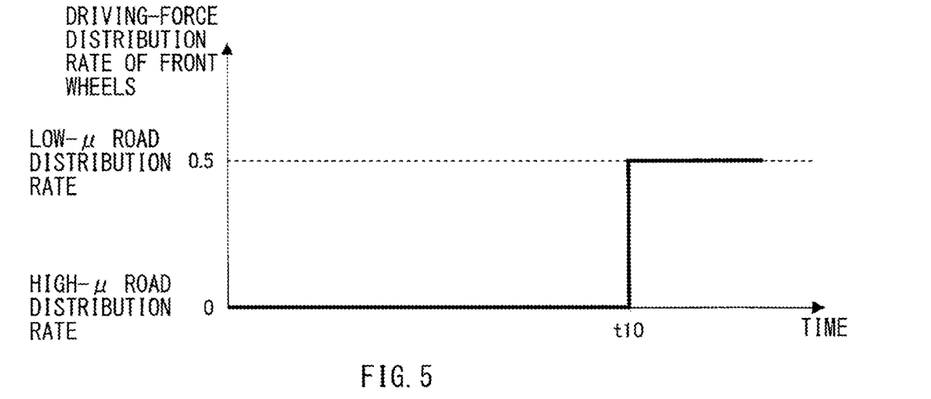
FIG. 5 schematically illustrates one example of a transition of a distribution rate of a driving force of front wheels in a case where a driving-force distribution control according to a reference example is performed.
Figure 6:
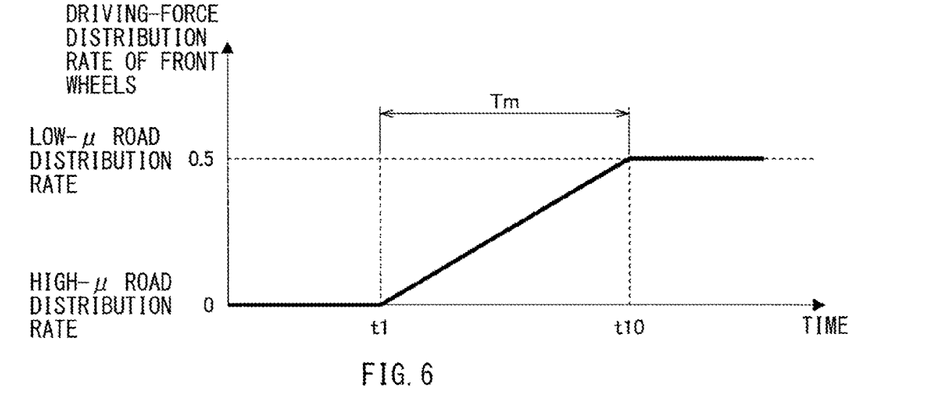
FIG. 6 schematically illustrates one example of the transition of the distribution rate of the driving force of the front wheels in a case where a driving-force distribution control according to the implementation is performed.
Figure 7:
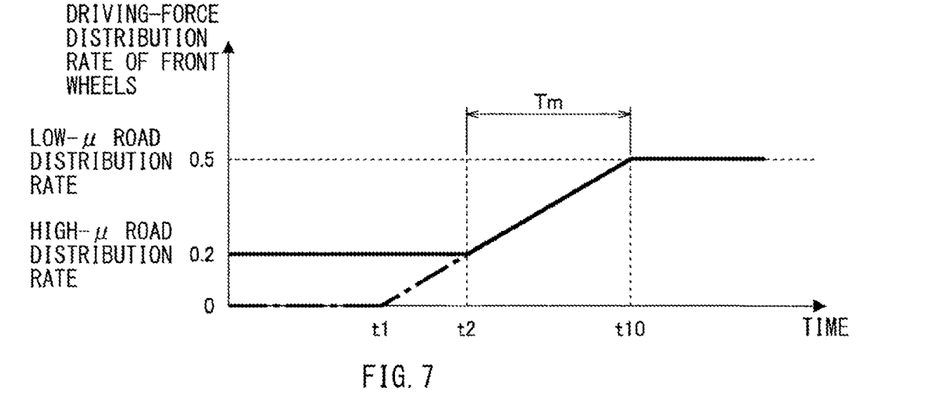
FIG. 7 schematically illustrates another example of the transition of the distribution rate of the driving force of the front wheels in the case where the driving-force distribution control according to the implementation is performed.

With reference to FIGS. 5 to 7, described next is the transition of the driving-force distribution rate of the front wheels in a case where a driving-force distribution control according to a reference example is performed and in a case where a driving-force distribution control according to this implementation is performed.

FIG. 5 schematically illustrates one example of the transition of the driving-force distribution rate of the front wheels in the case where the driving-force distribution control according to the reference example is performed. Specifically, FIG. 5 illustrates the transition of the driving-force distribution rate of the front wheels in a case where a vehicle travels at time before time t10 on the high-μ road R10 to which the low-μ road R20 is coupled frontward, arrives at the point of change 5 at the time t10, and travels on the low-μ road R20 at and after the time t10. It is to be noted that as with FIG. 5, FIGS. 6, 7, and 10 also illustrate the transition of the driving-force distribution rate of the front wheels in the case where the vehicle 1 traveling on the high-μ road R10 to which the low-μ road R20 is coupled frontward arrives at the point of change 5 at the time t10.

The driving-force distribution control according to the reference example may include controlling the driving-force distribution of the front and rear wheels to differ between on travel on the high-μ road R10 and on travel on the low-μ road R20. In the reference example, the high-μ road distribution rate may be, for example, zero (0), while the low-μ road distribution rate may be, for example, 0.5. Accordingly, as illustrated in FIG. 5, at the time before the time t10, the driving-force distribution rate of the front wheels may be brought to zero (0). At and after the time t10, the driving-force distribution rate of the front wheels may be brought to 0.5.

Here, in the driving-force distribution control according to the reference example, the switching of the driving-force distribution rate of the front wheels may be triggered by a determination that the vehicle has passed through the high-μ, road R10 and has entered the low-μ road R20. For example, in the reference example, the determination is made that the vehicle has passed through the high-μ road R10 and has entered the low-μ road R20 on the basis of detection of occurrence of a slip of a driving wheel. In the reference example, therefore, the switching of the driving-force distribution may be started at the earliest at the time t10 when the vehicle arrives at the point of change 5. This involves stepwise switching the driving-force distribution in order to enhance the stability of the vehicle. Accordingly, in the reference example, as illustrated in FIG. 5, at the time t10, the driving-force distribution rate of the front wheels may be stepwise switched from the high-μ road distribution rate to the low-μ road distribution rate. This results in an abrupt change in vehicle behavior, causing possibility of giving the driver the sense of incongruity.

FIG. 6 schematically illustrates one example of the transition of the driving-force distribution rate of the front wheels in the case where the driving-force distribution control according to this implementation is performed. In this implementation, in the case where the energy saving mode is selected by the driver as the traveling mode, the high-μ, distribution rate may be brought to, for example, zero (0). Moreover, the low-μ road distribution rate is assumed to be set at 0.5 in advance. Accordingly, as illustrated in FIG. 6, at the time before the time t10, the driving-force distribution rate of the front wheels may be basically brought to zero (0). At and after the time t10, the driving-force distribution rate of the front wheels may be brought to 0.5.

Here, the driving-force distribution control according to this implementation may include causing the transition of the driving-force distribution of the front and rear wheels from the high-μ road distribution to the low-μ road distribution at the predetermined time change rate, until the vehicle 1 arrives at the point of change 5. In one specific but non-limiting example, in the case where the arrival time Ta is longer than the transition time Tm, the driving force distribution control unit 166 may maintain the driving-force distribution at the high-μ distribution. Upon the arrival time Ta being equal to or shorter than the transition time Tm, the driving force distribution control unit 166 may start the transition of the driving-force distribution from the high-μ road distribution to the low-μ road distribution at the predetermined time change rate. Accordingly, as illustrated in FIG. 6, at time before time t1 when the arrival time Ta coincides with the transition time Tm, the driving-force distribution rate of the front wheels may be kept at zero (0). Thereafter, from the time t1 when the arrival time Ta coincides with the transition time Tm to the time t10 when the vehicle 1 arrives at the point of change 5, the transition of the driving-force distribution rate of the front wheels may be made from the high-μ road distribution rate to the low-μ road distribution rate.

As described, in this implementation, it is possible to prevent the driving-force distribution of the front and rear wheels from being stepwise switched, as the vehicle 1 passes through the point of change 5. Moreover, it is possible to complete the switching of the driving-force distribution of the front and rear wheels, at and before the point of time when the vehicle 1 arrives at the point of change 5. Hence, it is possible to restrain the abrupt change in the behavior of the vehicle 1, while enhancing the stability of the vehicle 1.

In the forgoing, with reference to FIG. 6, described is an example in which the drive state of the vehicle 1 may be brought to the two-wheel drive state on travel on the high-μ road R10. However, on travel on the high-μ, road R10, the drive state of the vehicle 1 may be brought to the four-wheel drive state. In other words, the high-μ road distribution may be any imbalanced distribution to rear-wheel side, and the high-μ road distribution rate does not have to be zero (0). For example, in the case where the stability emphasizing mode is selected by the driver as the traveling mode, the high-μ road distribution rate may be brought to 0.2. In this case, as illustrated in FIG. 7, at the time before the time t10, the driving-force distribution rate of the front wheels may be basically brought to 0.2. It is to be noted that in FIG. 7, the transition of the driving-force distribution rate of the front wheels illustrated in FIG. 6 is denoted by a dash-dot line. Moreover, in the example illustrated in FIG. 7, the low-μ road distribution rate is assumed to be set at 0.5 in advance.

Here, the time change rate of the driving-force distribution rate of the front wheels may be, for example, the identical time change rate independent of the high-μ road distribution rate and the low-μ road distribution rate, as mentioned above. Thus, the transition time Tm becomes shorter in a case where the high-μ road distribution rate is 0.2, than in a case where the high-μ road distribution rate is zero (0). Accordingly, as illustrated in FIG. 7, at time t2 after the time t1, the arrival time Ta coincides with the transition time Tm, and from the time t2 to the time t10, the driving-force distribution rate of the front wheels makes a transition from 0.2 as the high-μ, road distribution rate to 0.5 as the low-μ road distribution rate. As described, making the transition of the driving-force distribution at the identical time change rate independent of the first distribution and the second distribution makes it possible to reduce the sense of incongruity given to the driver, regardless of the first distribution.

Moreover, in the forgoing, with reference to FIG. 6, described is an example in which the low-μ road distribution rate may be set at 0.5 in advance. However, for example, the distribution decision unit 162 may decide the low-μ road distribution rate on the basis of the road-surface information, as mentioned above. In the following, with reference to FIGS. 8 to 10, description is given on decision processing of the low-μ road distribution rate based on the road-surface information to be performed by the distribution decision unit 162.

Figure 8:
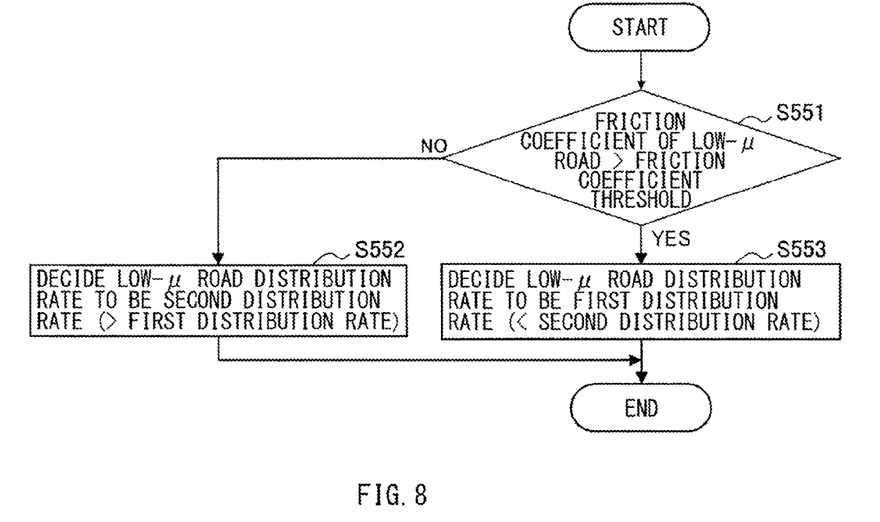
FIG. 8 is a flowchart that illustrates a first example of a flow of decision processing of a low-$\mu$ road distribution rate to be performed by the control device according to the implementation.

FIG. 8 is a flowchart of a first example of a flow of the decision processing of the low-μ road distribution rate to be performed by the control device 100 according to this implementation. The decision processing corresponds to part of processing of step S550 in the flowchart illustrated in FIG. 4.

Referring to FIG. 8, in the first example, the distribution decision unit 162 may, first, determine whether or not the friction coefficient of the low-μ road R20 is larger than the friction coefficient threshold (step S551). In a case where a determination has been made that the friction coefficient of the low-μ road R20 is larger than the friction coefficient threshold (step S551/YES), the distribution decision unit 162 may decide the low-μ road distribution rate to be the first distribution rate lower than the second distribution rate (step S553). In a case where a determination has been made that the friction coefficient of the low-μ road R20 is equal to or smaller than the friction coefficient threshold (step S551/NO), the distribution decision unit 162 may decide the low-μ road distribution rate to be the second distribution rate higher than the first distribution rate (step S552). After processing of step S553 or step S552, the processing illustrated in FIG. 8 may be terminated.

Figure 9:
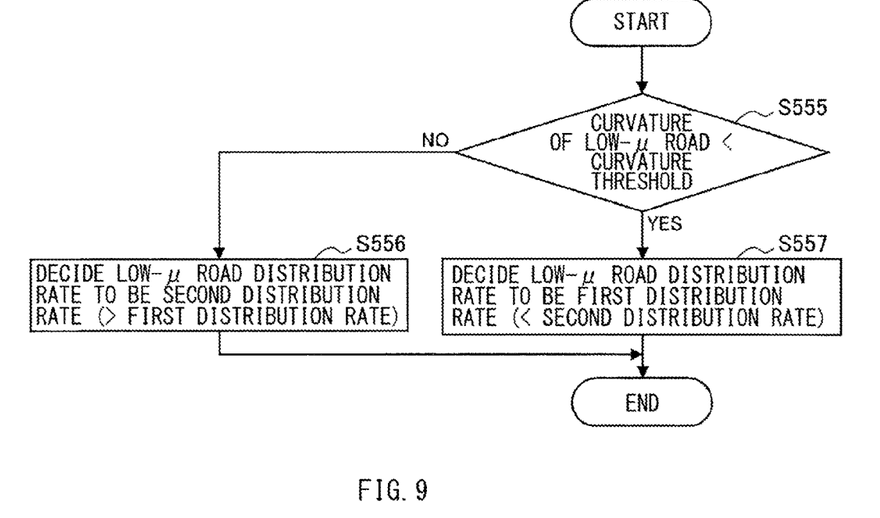
FIG. 9 is a flowchart that illustrates a second example of the flow of the decision processing of the low-$\mu$ road distribution rate to be performed by the control device according to the implementation.

FIG. 9 is a flowchart of a second example of the flow of the decision processing of the low-μ road distribution rate to be performed by the control device 100 according to this implementation. The decision processing corresponds to part of the processing of step S550 in the flowchart illustrated in FIG. 4.

As illustrated in FIG. 9, in the second example, the distribution decision unit 162 may, first, determine the curvature of the low-μ road R20 is smaller than the curvature threshold (step S555). In a case where a determination has been made that the curvature of the low-μ road R20 is smaller than the curvature threshold (step S555/YES), the distribution decision unit 162 may decide the low-μ road distribution rate to be the first distribution rate lower than the second distribution rate (step S557). In a case where a determination has been made that the curvature of the low-μ road R20 is equal to or larger than the curvature threshold (step S555/NO), the distribution decision unit 162 may decide the low-μ road distribution rate to be the second distribution rate higher than the first distribution rate (step S556). After processing of step S557 or step S556, the processing illustrated in FIG. 9 may be terminated.

Figure 10:
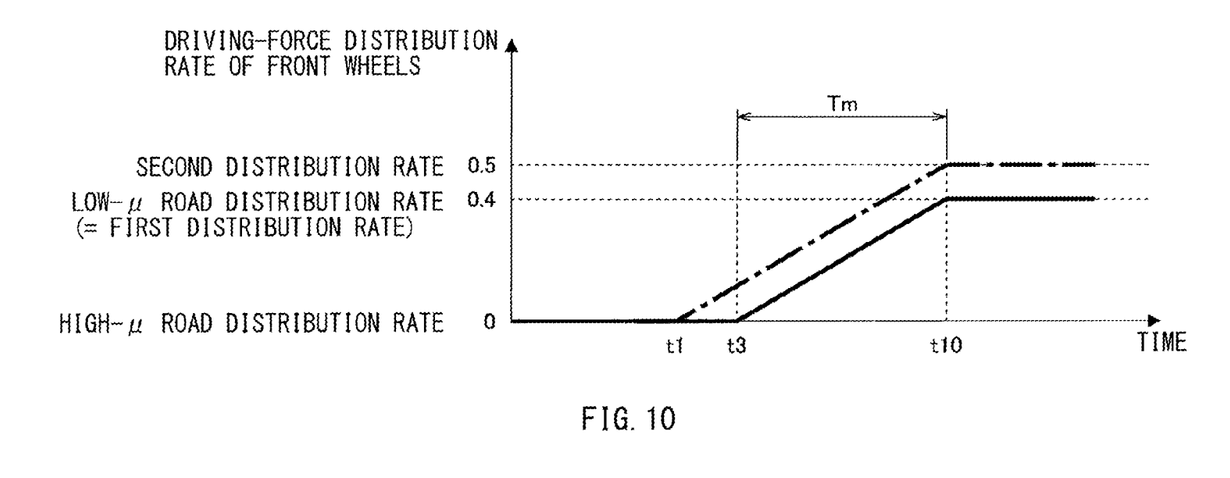
FIG. 10 schematically illustrates another example of the transition of the distribution rate of the driving force of the front wheels in the case where the driving-force distribution control according to the implementation is performed.

The distribution decision unit 162 may decide the low-μ road distribution rate on the basis of the road-surface information, as in the first example illustrated in FIG. 8 and the second example illustrated in FIG. 9. The second distribution rate in the first example and the second example may be set at, for example, 0.5 from a viewpoint of emphasis on the stability of the vehicle 1. Moreover, the first distribution rate may be set at, for example, 0.4. In the case where the low-μ road distribution rate is decided to be the first distribution rate, as illustrated in FIG. 10, at and after the time t10, the driving-force distribution rate of the front wheels may be brought to 0.4. It is to be noted that in FIG. 10, the transition of the driving-force distribution rate of the front wheels illustrated in FIG. 6 is denoted by a dot-dash line. Moreover, in the example illustrated in FIG. 10, the high-μ, road distribution rate is assumed to be zero (0).

Here, the time change rate of the driving-force distribution rate of the front wheels may be, for example, the identical time change rate independent of the high-μ, road distribution rate and the low-μ road distribution rate, as mentioned above. Thus, the transition time Tm becomes shorter in the case where the low-μ road distribution rate is 0.4, than in the case where the low-μ road distribution rate is 0.5. Accordingly, as illustrated in FIG. 10, at time t3 after the time t1, the arrival time Ta coincides with the transition time Tm, and from the time t3 to the time t10, the driving-force distribution rate of the front wheels makes a transition from zero (0) as the high-μ, road distribution rate to 0.4 as the low-μ road distribution rate. As described, causing the transition of the driving-force distribution at the identical time change rate independent of the first distribution and the second distribution makes it possible to reduce the sense of incongruity given to the driver, regardless of the second distribution rate.

3. CONCLUSION

As described, in this implementation, the controller 160 causes the transition of the driving-force distribution of the front and rear wheels from the first distribution to the second distribution at the predetermined time change rate, until the vehicle 1 arrives at the point of change 5, i.e., the point at which the friction coefficient of the road surface changes frontward of the vehicle 1. This makes it possible to prevent the driving-force distribution of the front and rear wheels from being stepwise switched, as the vehicle 1 passes through the point of change 5. Moreover, it is possible to complete the switching of the driving-force distribution of the front and rear wheels, at and before the point of time when the vehicle 1 arrives at the point of change 5. Hence, it is possible to restrain the abrupt change in the behavior of the vehicle 1, while enhancing the stability of the vehicle 1.

It is to be noted that in the forgoing, described is an example in which the controller 160 may control the driving-force distribution of the front and rear wheels, by controlling the driving-force distribution rate of the front wheels. However, the controller 160 may control the driving-force distribution of the front and rear wheels, by controlling the driving-force distribution rate of the rear wheels.

Moreover, in the forgoing, described mainly is an example in which on travel on the high-μ, road R10, the controller 160 may bring the drive state of the vehicle 1 to the rear-wheel-driven two-wheel drive state, by basically bringing the driving-force distribution rate of the front wheels to zero (0). However, on travel on the high-μ, road R10, the controller 160 may bring the drive state of the vehicle 1 to a front-wheel-driven two-wheel drive state. For example, on travel on the high-μ, road R10, the controller 160 may bring the drive state of the vehicle 1 to the front-wheel-driven two-wheel drive state, by basically bringing the driving-force distribution rate of the front wheels to one (1). Furthermore, the controller 160 may apply, as the high-µ, road distribution, imbalanced distribution to front-wheel side. A value of the high-µ, road distribution rate may be, for example, 0.8.

Furthermore, in the forgoing, described mainly is an example in which the low-µ road distribution rate may be 0.5. However, there is no particular limitation on a value of the low-µ road distribution rate. For example, the low-µ road distribution rate may be appropriately set at other values than 0.5, in accordance with a front-to-rear weight ratio of the vehicle 1. In another alternative, the low-µ road distribution rate may be set at a value larger than 0.5, e.g., 0.6, in order to enhance a tendency of understeer for a purpose of further enhancement in the safety of the vehicle 1.

In addition, in the forgoing, described is an example in which the technology may be applied to the vehicle 1 including the engine 21 and the drive motor 35. The engine 21 may serve as the driving source that drives the left front wheel 11a and the right front wheel 11b. The drive motor 35 may serve as the driving source that drives the left rear wheel 11c and the right rear wheel 11d. However, a technical scope of the technology is not limited to as exemplified above. The technology may be applied to vehicles having other configurations as long as the vehicles are able to control the driving-force distribution of the front and rear wheels. For example, in the vehicles to which the technology is applied, the engine 21 may be replaced by a drive motor, as the driving source that drives the left front wheel 11a and the right front wheel 11b. Moreover, in the vehicles to which the technology is applied, a drive motor may be provided for each driving wheel.

Moreover, the processing as described herein with the use of the flowcharts is not necessarily executed in the order illustrated in the flowcharts. Some processes of steps may be executed in parallel. For example, in the flowchart illustrated in FIG. 4, processes of steps S503, S505, and S507 do not have to be executed in the order illustrated in the flowchart, but may be executed in parallel. Furthermore, in the flowchart illustrated in FIG. 4, the determination process of step S501 may be executed after the processes of steps S503, S505, S507, and S509. Moreover, additional processes of steps may be adopted, or alternatively, some processes of steps may be omitted.

The controller 160 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 160. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the controller 160 illustrated in FIG. 3.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A control device for a vehicle, the control device comprising;
    a processor coupled to a memory storing instructions, the processor being configured to: cause a transition of a distribution of driving forces of front wheels and rear wheels, from a first distribution to a second distribution at a predetermined time change rate, until the vehicle arrives at a point of change, the point of change being a point at which a friction coefficient of a road surface changes frontward of the vehicle;
    calculate an arrival time it takes for the vehicle to arrive at the point of change;
    calculate a transition time it takes for the distribution of the driving forces to make the transition from the first distribution to the second distribution at the predetermined time change rate; and
    start, on a basis of a comparison result of the transition time to the arrival time, the transition of the distribution of the driving forces from the first distribution to the second distribution at the predetermined time change rate.

2. The control device for the vehicle according to claim 1, wherein the processor is further configured to-execute the transition of the distribution of the driving forces of the front wheels and the rear wheels, from the first distribution to the second distribution at the predetermined time change rate, on a condition that the friction coefficient of the road surface decreases at the point of change, and
    wherein a difference between a distribution rate of the driving force of the front wheels and a distribution rate of the driving force of the rear wheels in the second distribution is smaller than a difference between a distribution rate of the driving force of the front wheels and a distribution rate of the driving force of the rear wheels in the first distribution.

3. The control device for the vehicle according to claim 2, wherein the processor is further configured to decide the second distribution, on a basis of road-surface information, the road-surface information being information regarding the road surface frontward of the point of change.

4. The control device for the vehicle according to claim 2, wherein the processor is further configured to decide the first distribution, in response to an operation of selection made by a driver of the vehicle.

5. The control device for the vehicle according to claim 2, wherein the processor is further configured to execute the transition of the distribution of the driving forces of the front wheels and the rear wheels, from the first distribution to the second distribution at the predetermined time change rate, on a condition that the friction coefficient of the road surface decreases at the point of change, and
    wherein a difference between a distribution rate of the driving force of the front wheels and a distribution rate of the driving force of the rear wheels in the second distribution is smaller than a difference between a distribution rate of the driving force of the front wheels and a distribution rate of the driving force of the rear wheels in the first distribution.

6. The control device for the vehicle according to claim 5, wherein the processor is further configured to decide the second distribution, on a basis of road-surface information, the road-surface information being information regarding the road surface frontward of the point of change.

7. The control device for the vehicle according to claim 5, wherein the processor is further configured to decide the first distribution, in a response to an operation of a selection made by a driver of the vehicle.

8. The control device for the vehicle according to claim 5, wherein the predetermined time change rate is an identical time change rate independent of the first distribution and the second distribution.

9. The control device for the vehicle according to claim 2, wherein the predetermined time change rate is an identical time change rate independent of the first distribution and the second distribution.

10. The control device for the vehicle according to claim 1, wherein the processor is further configured to calculate the arrival time, on a basis of a speed of the vehicle at a current point of time, acceleration of the vehicle, and a distance from the vehicle to the point of change.

11. The control device for the vehicle according to claim 10, wherein the processor is further configured to decide the second distribution, on a basis of road-surface information, the road-surface information being information regarding the road surface frontward of the point of change.

12. The control device for the vehicle according to claim 10, wherein the processor is further configured to decide the first distribution, in response to an operation of selection made by a driver of the vehicle.

13. The control device for the vehicle according to claim 10, wherein the predetermined time change rate is an identical time change rate independent of the first distribution and the second distribution.

14. The control device for the vehicle according to claim 1, wherein the processor is further configured to decide the second distribution, on a basis of road-surface information, the road-surface information being information regarding the road surface frontward of the point of change.

15. The control device for the vehicle according to claim 14, wherein the road-surface information includes information indicating the friction coefficient of the road surface frontward of the point of change.

16. The control device for the vehicle according to claim 15, wherein the road-surface information includes information indicating a shape of the road surface frontward of the point of change.

17. The control device for the vehicle according to claim 14, wherein the road-surface information includes information indicating a shape of the road surface frontward of the point of change.

18. The control device for the vehicle according to claim 1, wherein the processor is further configured to decide the first distribution, in a response to an operation of a selection made by a driver of the vehicle.

19. The control device for the vehicle according to claim 1, wherein the predetermined time change rate is an identical time change rate independent of the first distribution and the second distribution.

20. A control device for a vehicle, the control device comprising:
    a circuitry configured to cause a transition of a distribution of driving forces of front wheels and rear wheels, from a first distribution to a second distribution at a predetermined time change rate, until the vehicle arrives at a point of change, the point of change being a point at which a friction coefficient of a road surface changes frontward of the vehicle; and
    an arrival time calculation circuit configured to calculate an arrival time it takes for the vehicle to arrive at the point of change,
    wherein the circuitry includes:
        a transition time calculation circuit configured to calculate a transition time it takes for the distribution of the driving forces to make the transition from the first distribution to the second distribution at the predetermined time change rate; and
        a driving force distribution control circuit configured to start, on a basis of a comparison result of the transition time to the arrival time, the transition of the distribution of the driving forces from the first distribution to the second distribution at the predetermined time change rate.

* * * * *